Nov. 5, 1968     W. OSTBERG ET AL     3,409,333
PADS FOR CEMENT CARGO CARRIERS
Filed Jan. 2, 1968     2 Sheets-Sheet 1
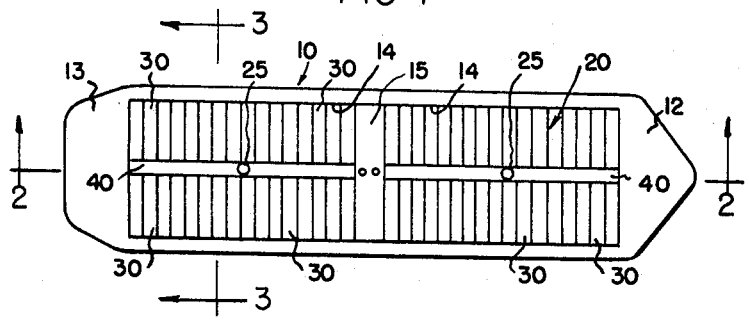
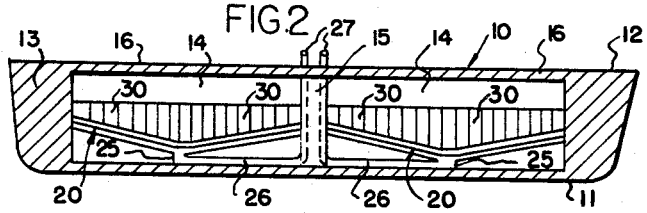
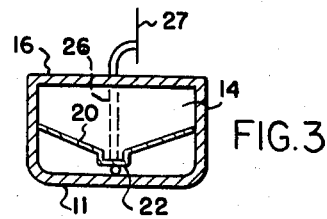
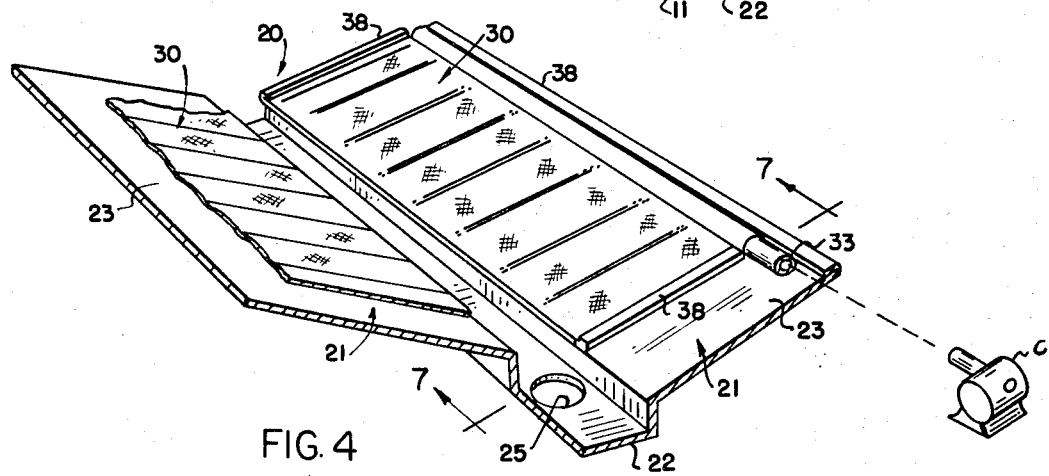
INVENTORS
WERNER OSTBERG
MICHAEL D. CHALLIS
BY *Cullen, Sloman, & Cantor*
ATTORNEYS Nov. 5, 1968  W. OSTBERG ET AL  3,409,333
PADS FOR CEMENT CARGO CARRIERS
Filed Jan. 2, 1968  2 Sheets-Sheet 2
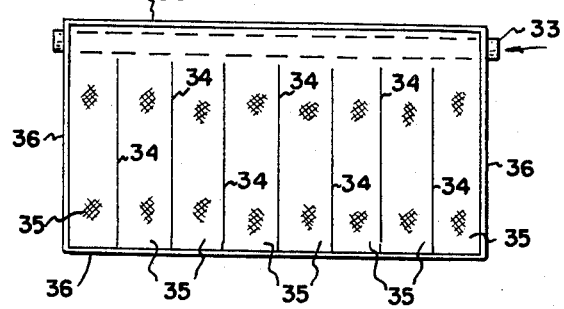
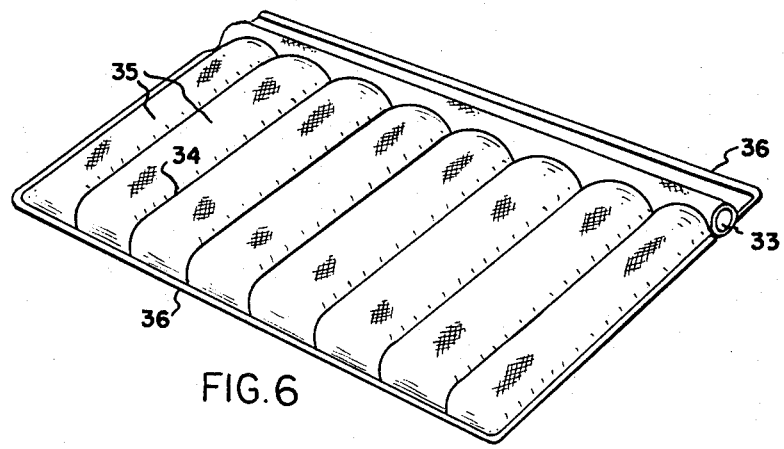
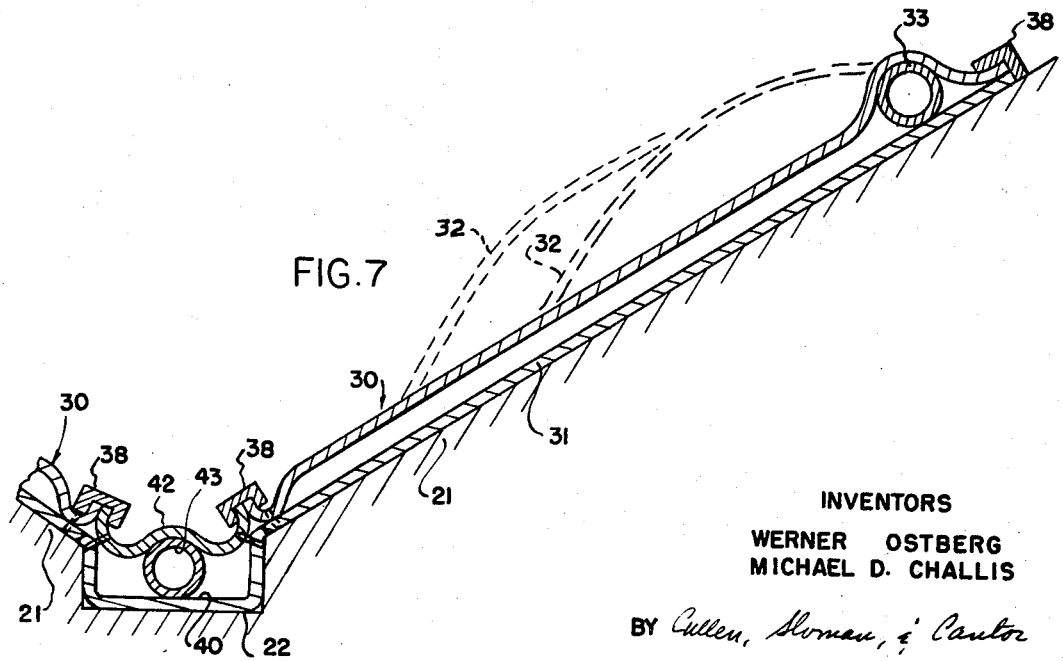
INVENTORS
WERNER OSTBERG
MICHAEL D. CHALLIS
BY *Cullen, Sloman, & Cantor*
ATTORNEYS

United States Patent Office 3,409,333
Patented Nov. 5, 1968

3,409,333
PADS FOR CEMENT CARGO CARRIERS
Werner Ostberg, Milan, and Michael D. Challis, Ann Arbor, Mich., assignors to Dundee Cement Company, Dundee, Mich.
Continuation-in-part of application Ser. No. 587,158, Oct. 7, 1966. This application Jan. 2, 1968, Ser. No. 695,271
1 Claim. (Cl. 302—52)

ABSTRACT OF THE DISCLOSURE

An envelope or pad for covering the sloped floor of a cargo carrier hold through which envelope air is pumped for fluidizing and moving dry, particulate, bulk cargo, the envelope being transversely sectioned by lines of stitching, and a perforated air delivery pipe extending through the sections and located along the envelope edge which is at the top of the slope for progressively billowing the envelope as the cargo level drops down the slope for thereby moving the cargo to the bottom of the slope for emptying the hold.

Parent application

This application is a continuation-in-part of our prior application Ser. No. 587,158, filed Oct. 7, 1966, now Patent No. 3,375,042. Whereas the prior application is directed to the combination of a container, a rigid floor, and flexible pads or envelopes, this application is directed to the envelope or pad per se.

Background of the invention

As described in our prior application, dry bulk particulate material such as cement powder is characterized by being fluidized when mixed with a pressurized gas, such as air, wherein such material may be easily conveyed as if it were a fluid material. It is known to provide in cargo holds or containers, for transporting such materials to a discharge point or points, means to convey air or the like gas into such container or hold in such a way as to fluidize the material so that it may be conveniently discharged from the container or hold by gravity, suction, or blown under pressure or by any other means.

However, in the past, final emptying of such containers, particularly when the containers were almost at the empty point has been done manually because of the difficulty of fluidizing and moving and gathering small quantities of particulate materials spread over the large floor of the container during such final emptying.

Summary of invention

Hence, it is an object of this invention to provide not only a fluidizing construction but also to form such fluidizing construction so that it will function properly for final emptying whereby it will function for final removal of all the material automatically without the need for manual or hand labor.

Another object of this invention is to provide an envelope having an upper air permeable sheet, for covering the sloping floor of a container, with a perforated air delivery pipe extending through the envelope along its high edge for delivering compressed air through the envelope and progressively billowing the envelope from the top to the bottom of the slope as the level of cargo in the container decreases for thereby moving the cargo down the slope.

Other objects and advantages of the application will become apparent upon reading the following description of which the attached drawings form a part.

Description of drawings

In these drawings:

FIG. 1 is a schematic top plan view of a cargo carrying, river barge with the upper hatches or covers removed.

FIG. 2 is a schematic longitudinal section view as if on the arrows 2—2 of FIG. 1.

FIG. 3 is a cross-section view on arrows 3—3 of FIG. 1.

FIG. 4 is a perspective view of a support floor.

FIG. 5 is a plan view of a single envelope.

FIG. 6 is a perspective view showing an envelope inflated.

FIG. 7 is a cross-sectional view to an enlarged scale taken in the direction of arrows 7—7 of FIG. 4 and illustrates diagrammatically the functioning of the envelope for final emptying.

Schematically illustrated is a large cargo carrying barge 10 having a bottom 11 with hold 15 separated by a bulkhead 15 and normally covered by covers or hatches, not shown.

A load supporting floor 20 is built into hold 14 and includes a V-shaped floor part 21 sloped to form a central flattened trough 22 having a well 25 to which is connected a suction pipe 26 extending upwardly for emptying the trough 22.

Covering the floor are large flattened pads or envelopes 30 each comprising a lower sheet 31 of an air impermeable material and an upper sheet 32 of air permeable material, both of any suitable form.

A perforated pipe 33 within the envelope is connected to an air compressor C for supplying low pressure air to pipe 33.

The upper and lower sheets of the envelope are fastened together not only at their outer and inner and end edges, but also transversely by stitch lines 34 connecting the two side edges of the envelope so as to divide the envelope into a number of sections 35 each communicated with pipe 33.

Corded edge beads 36 are formed on the edge of the envelope for reinforcement, and anchoring strips 38 are provided to secure the envelope in place.

It is important to note that pipe 33 is at the upper, outer edge of the pad or envelope 30. This is the novel feature of the present construction and its special value will later be described.

Operation

When air is pumped into the envelopes 30 through pipes 33 at low pressure, the envelopes are not inflated but air passing through the upper sheets fluidizes the dry, particulate cement cargo so that the cement flows easily down and through and into trough 22 and out through well 25 and pipe 26, the latter being connected to a vacuum pump for emptying the cement from the trough 22 into which the cement had been moved by air entering through pipes 33.

As the level of the cargo reduces, its weight upon the envelopes likewise reduces. Thus, the envelopes begin to inflate. This begins the final emptying process. In such process, the envelopes billow up progressively, starting at their upper, outer edges and continuing towards the trough 22, as shown schematically in dotted lines in FIG. 7.

The areas at the stitching lines 34 provide channels which direct the cement downwardly into the trough 22. Thus, the progressive billowing or inflation of the envelopes starting at the upper, outer edges serves to break up the bulk material and move all of the material down the slope and into trough 22 for ultimate discharge, thereby emptying the last remnants of the cargo, without requiring manual sweeping thereof.

Locating the air pipes 33 at the upper, outer edges of the pads or envelopes 30 causes complete removal of the cargo from the floor, by the progressive billowing of the envelopes from the outer edges down towards the center.

Now having described one operative embodiment of the invention, we now claim as follows:

1. In a bulk container used for containing dry, bulk particulate material and having upstanding enclosing side walls and a rigid floor extending from side wall to side wall and sloped downwardly from the side walls towards the center to form a funnel-like central trough having means for removing the material in said trough after it slides down into said trough from the sloping parts of the floor, the improvement comprising a non-rigid envelope adapted to be rested upon and covering at least one of the sloping parts of the floor;

said envelope having a lower air impermeable flat sheet for overlying and covering the upper surface of one sloping half of the floor:

and an upper air permeable sheet having its peripheral edges secured to the peripheral edges of said lower sheet to form both said sheets into a closed envelope;

with the sheets of such envelope being secured together along spaced apart transverse stitch lines running from their lower-center-floor edges to a point somewhat distant from but adjacent their high-wall-adjacent peripheral edges, to thus form such envelope into a number of separate envelope sections terminating short of the upper edge, with the high-wall-adjacent edges being parallel to the lower center-floor edge of the envelope;

said envelope also including means for delivering air into and through the envelope including a perforated pipe between the upper and lower sheets and between the upper ends of the transverse stitch lines and the upper edge of the envelope and extending the full length of the envelope past the upper ends of all the sections of the envelope for uniformly delivering air to all sections of the envelope, whereby said sections will billow out between said lines when the weight of the cargo becomes sufficiently reduced during removal of the cargo from the container so that the areas at said lines form valleys running downwardly towards the low center trough for directing flow of the cargo material towards the center trough;

said pipe extending along the upper edge of the envelope in a direction parallel to its lower edge, and perpendicular to the valleys formed by said transverse securing lines, thereby to cause such air to uniformly permeate through the upper sheet and into the bulk cargo supported on the floor to thereby fluidize the cargo material and permit removal of the same at the low point of the floor with the entering air progressively billowing the upper sheet of the envelope in continuous longitudinal waves parallel to its lower edge starting from its outer edge towards its lower edge.

References Cited

UNITED STATES PATENTS

| 2,805,897 | 9/1957 | Yellott | 302—29 |
| 2,919,955 | 1/1960 | Paton | 302—29 |
| 2,943,891 | 7/1960 | Paton | 302—29 |
| 2,981,567 | 4/1961 | Hermanns | 302—52 |
| 3,061,379 | 10/1962 | Lusted | 302—29 |

ANDRES H. NIELSEN, *Primary Examiner.*